US012179241B2

(12) United States Patent
Suetsugu

(10) Patent No.: US 12,179,241 B2
(45) Date of Patent: Dec. 31, 2024

(54) AIR SHOWER APPARATUS

(71) Applicant: Katsunori Suetsugu, Tokyo (JP)

(72) Inventor: Katsunori Suetsugu, Tokyo (JP)

(*) Notice: Subject to any disclaimer, the term of this patent is extended or adjusted under 35 U.S.C. 154(b) by 383 days.

(21) Appl. No.: 17/725,823

(22) Filed: Apr. 21, 2022

(65) Prior Publication Data

US 2022/0355347 A1 Nov. 10, 2022

(30) Foreign Application Priority Data

May 6, 2021 (JP) ................................ 2021-078311

(51) Int. Cl.
*B08B 5/02* (2006.01)
*F24F 3/167* (2021.01)

(52) U.S. Cl.
CPC ................ *B08B 5/02* (2013.01); *F24F 3/167* (2021.01)

(58) Field of Classification Search
CPC ................ F24F 3/167; F24F 9/00; B08B 5/02
See application file for complete search history.

(56) References Cited

FOREIGN PATENT DOCUMENTS

| | | |
|---|---|---|
| CN | 110639893 | 1/2020 |
| CN | 210788437 | 6/2020 |
| JP | 60-137460 | 7/1985 |
| JP | 1-281350 | 11/1989 |
| JP | 7-032439 | 6/1995 |
| JP | 2004-176597 | 6/2004 |
| JP | 2006118739 A * | 5/2006 |

OTHER PUBLICATIONS

Notice of Reasons for Refusal issued Aug. 10, 2021 in corresponding Japanese Patent Application No. JP 2021-078311.

* cited by examiner

*Primary Examiner* — Edelmira Bosques
*Assistant Examiner* — Michael James Giordano
(74) *Attorney, Agent, or Firm* — WENDEROTH, LIND & PONACK, L.L.P.

(57) ABSTRACT

An air shower apparatus includes a plurality of blowers provided in a face portion, and a plurality of blowers provided in a face portion disposed to face the face portion. A suction port included in a blower is disposed to face a blow-out port included in a blower. In a set of the blower and the blower, the blower blows out a spiral airflow from the blow-out port, and the blower sucks the spiral airflow from the suction port. The air shower apparatus generates an air shower by a plurality of spiral airflows blown out from a plurality of blow-out ports.

6 Claims, 8 Drawing Sheets

AIR SHOWER APPARATUS

BACKGROUND OF THE INVENTION

1. Technical Field

The present invention relates to an air shower apparatus that generates an air shower.

2. Description of the Related Art

At an entrance to a clean space maintained in a clean environment such as a clean room, an air shower apparatus for removing dust and dirt adhering to clothes of a person entering the room is installed. The air shower apparatus generates an air shower inside an air shower chamber provided in the air shower apparatus in a state where a person entering a clean room or the like is in the air shower chamber, and removes dust adhering to clothes of the person entering the room by the generated air shower.

JP 2004-176597 A discloses a technique in which, in an air shower apparatus, a cylindrical airflow direction changing body including an inclined wall surface obliquely facing a direction of air flowing in from a blower is rotatably and axially supported by an inner central axis of an exterior body provided in communication with a blowout port of the blower, and blades that obtain a rotational force for rotating the airflow direction changing body by being hit by the air flowing in from the blower are provided in the airflow direction changing body.

JP H07-32439 U discloses a technique in which a spiral member is provided in an air jet nozzle in an air shower apparatus.

SUMMARY OF THE INVENTION

Most of the air shower apparatuses currently used in clean rooms and the like are air shower apparatuses that discharge air from multiple directions all at once, such as directions facing each other, and exhaust the discharged air from a direction irrelevant to the directions in which the air is discharged. Thus, there is a problem that the airflow (convection) is disturbed, and dust and dirt adhering to clothes of a person entering a clean room or the like are likely to fly around in the space of the air shower chamber.

In addition, there is a problem that it is difficult to easily install the air shower apparatus in a store, an office, a commercial facility, or the like because there is a high possibility that the airflow is disturbed and dust is scattered around, and the air shower apparatus is large-scale equipment used in a clean room or the like.

The present invention has been made to solve the above-described problems of the prior art, and an object of the present invention is to provide an air shower apparatus that generates an air shower inside an air shower chamber, which can prevent or suppress the airflow inside the air shower chamber from being disturbed, and can be easily installed and used.

An overview of a representative invention among the inventions disclosed in the present application will be briefly described as follows.

An air shower apparatus according to an aspect of the present invention is an air shower apparatus that includes a first face portion and a second face portion disposed to face each other in a first direction, and generates an air shower inside a first space between the first face portion and the second face portion. The air shower apparatus includes: a plurality of first blowers provided in the first face portion and each including a first blow-out port from which air is blown out; and a plurality of second blowers provided in the second face portion and each including a first suction port into which air is sucked, the first suction port being disposed to face the first blow-out port included in each of the plurality of first blowers. In a first set of a first blower and a second blower, the first blower blows out a first spiral airflow from the first blow-out port included in the first blower toward the first suction port included in the second blower, and the second blower sucks the first spiral airflow blown out by the first blower from the first suction port included in the second blower. In addition, the air shower apparatus generates the air shower inside the first space by a plurality of the first spiral airflows blown out from a plurality of the first blow-out ports included in each of the plurality of first blowers.

In addition, as another aspect, the air shower apparatus may include: a plurality of third blowers provided in the second face portion and each including a second blow-out port from which air is blown out; and a plurality of fourth blowers provided in the first face portion and each including a second suction port into which air is sucked, the second suction port being disposed to face the second blow-out port included in each of the plurality of third blowers. In a second set of a third blower and a fourth blower, the third blower may blow out a second spiral airflow from the second blow-out port included in the third blower toward the second suction port included in the fourth blower, and the fourth blower may suck the second spiral airflow blown out by the third blower from the second suction port included in the fourth blower. In addition, the air shower apparatus may generate the air shower inside the first space by a plurality of the second spiral airflows blown out from a plurality of the second blow-out ports included in each of the plurality of third blowers.

In addition, as another aspect, each of the plurality of the first blow-out ports may be disposed not overlapping any of the plurality of the second blow-out ports when viewed from the first direction.

In addition, as another aspect, the air shower apparatus may include a third face portion and a fourth face portion disposed to face each other in a second direction intersecting the first direction, and generate the air shower inside the first space between the third face portion and the fourth face portion. In addition, the air shower apparatus may further includes: a plurality of fifth blowers provided in the third face portion and each including a third blow-out port from which air is blown out; a plurality of sixth blowers provided in the fourth face portion and each including a third suction port into which air is sucked, the third suction port being disposed to face the third blow-out port included in each of the plurality of fifth blowers; a plurality of seventh blowers provided in the fourth face portion and each including a fourth blow-out port from which air is blown out; and a plurality of eighth blowers provided in the third face portion and each including a fourth suction port into which air is sucked, the fourth suction port being disposed to face the fourth blow-out port included in each of the plurality of seventh blowers. In a third set of a fifth blower and a sixth blower, the fifth blower may blow out a third spiral airflow from the third blow-out port included in the fifth blower toward the third suction port included in the sixth blower, and the sixth blower may suck the third spiral airflow blown out by the fifth blower from the third suction port included in the sixth blower. In a fourth set of a seventh blower and an eighth blower, the seventh blower may blow out a fourth spiral airflow from the fourth blow-out port included in the seventh blower toward the fourth suction port included in the eighth blower, and the eighth blower may suck the fourth spiral airflow blown out by the seventh blower from the fourth suction port included in the eighth blower. In addition, the air shower apparatus may generate the air shower inside the first space by a plurality of the third spiral airflows blown out from a plurality of the third blow-out ports included in each of the plurality of fifth blowers and a plurality of the fourth spiral airflows blown out from a plurality of the fourth blow-out ports included in each of the plurality of seventh blowers.

In addition, as another aspect, each of the plurality of first blowers may include a first grille provided in the first blow-out port and formed with a plurality of holes each having a spiral shape swirling clockwise or counterclockwise when viewed from the first direction.

An air shower apparatus according to an aspect of the present invention is an air shower apparatus that includes a first face portion and a second face portion disposed to face each other in a first direction, and generates an air shower inside a first space between the first face portion and the second face portion. The air shower apparatus includes: a plurality of first blowers provided in the first face portion and each including a first opening through which air is blown out; and a plurality of second blowers provided in the second face portion and each including a second opening through which air is sucked, the second opening being disposed to face the first opening included in each of the plurality of first blowers. In addition, the air shower apparatus includes: a plurality of third blowers provided in the second face portion and each including a third opening through which air is blown out or sucked; a plurality of fourth blowers provided in the first face portion and each including a fourth opening through which air is sucked or blown out, the fourth opening being disposed to face the third opening included in each of the plurality of third blowers; and a switching unit that switches operations of the plurality of third blowers and the plurality of fourth blowers. In a first set of a first blower and a second blower, the first blower blows out a first spiral airflow from the first opening included in the first blower toward the second opening included in the second blower, and the second blower sucks the first spiral airflow blown out by the first blower from the second opening included in the second blower. The switching unit switches the operations of the plurality of third blowers and the plurality of fourth blowers such that in a second set of a third blower and a fourth blower, the third blower blows out a second spiral airflow from the third opening included in the third blower toward the fourth opening included in the fourth blower, or the fourth blower blows out the third spiral airflow from the fourth opening included in the fourth blower toward the third opening included in the third blower, and when the third blower blows out the second spiral airflow, the fourth blower sucks the second spiral airflow blown out by the third blower from the fourth opening included in the fourth blower, and when the fourth blower blows out the third spiral airflow, the third blower sucks the third spiral airflow blown out by the fourth blower from the third opening included in the third blower. In addition, the air shower apparatus generates the air shower inside the first space by a plurality of the first spiral airflows blown out from a plurality of the first openings included in each of the plurality of first blowers and a plurality of the second spiral airflows blown out from a plurality of the third openings included in each of the plurality of third blowers or a plurality of the third spiral airflows blown out from a plurality of the fourth openings included in each of the plurality of fourth blowers.

In addition, as another aspect, each of the plurality of third blowers may include: a first cylindrical portion centered on a first axis along a first direction; a first fan provided rotatably about the first axis inside the first cylindrical portion; and a first drive unit that rotationally drives the first fan in a first rotational direction that is a clockwise or counterclockwise rotational direction, and the third opening may be provided at a first end portion of the first cylindrical portion on a side of the first face portion in the first direction. Each of the plurality of fourth blowers may include: a second cylindrical portion centered on a second axis along the first direction; a second fan provided rotatably about the second axis inside the second cylindrical portion; and a second drive unit that rotationally drives the second fan in a second rotational direction that is a clockwise or counterclockwise rotational direction, and the fourth opening may be provided at a second end portion of the second cylindrical portion on a side of the second face portion in the first direction. In the second set of the third blower and the fourth blower, the switching unit may switch the operations of the plurality of third blowers and the plurality of fourth blowers by switching the first rotational direction of the first fan rotationally driven by the first drive unit and the second rotational direction of the second fan rotationally driven by the second drive unit such that the first fan blows out air from the third opening, or the second fan blows out air from the fourth opening, and when the first fan blows out air from the third opening, the second fan sucks air from the fourth opening, and when the second fan blows out air from the fourth opening, the first fan sucks air from the third opening.

In addition, as another aspect, each of the plurality of the first openings may be disposed not overlapping any of the plurality of the third openings when viewed from the first direction.

In addition, as another aspect, the first direction may be a vertical direction, the first face portion may be a ceiling face portion, and the second face portion may be a floor face portion.

In addition, as another aspect, each of the plurality of first blowers may include a first grille provided in the first opening and formed with a plurality of holes each having a spiral shape swirling clockwise or counterclockwise when viewed from the first direction. Each of the plurality of third blowers may include a second grille provided in the third opening and formed with a plurality of holes each having a spiral shape swirling clockwise or counterclockwise when viewed from the first direction. Each of the plurality of fourth blowers may include a third grille provided in the fourth opening and formed with a plurality of holes each having a spiral shape swirling clockwise or counterclockwise when viewed from the first direction.

By applying one aspect of the present invention, it is possible to prevent or suppress the airflow inside the air shower chamber from being disturbed, and it is possible to easily install and use the air shower apparatus.

DETAILED DESCRIPTION

Figure 1:
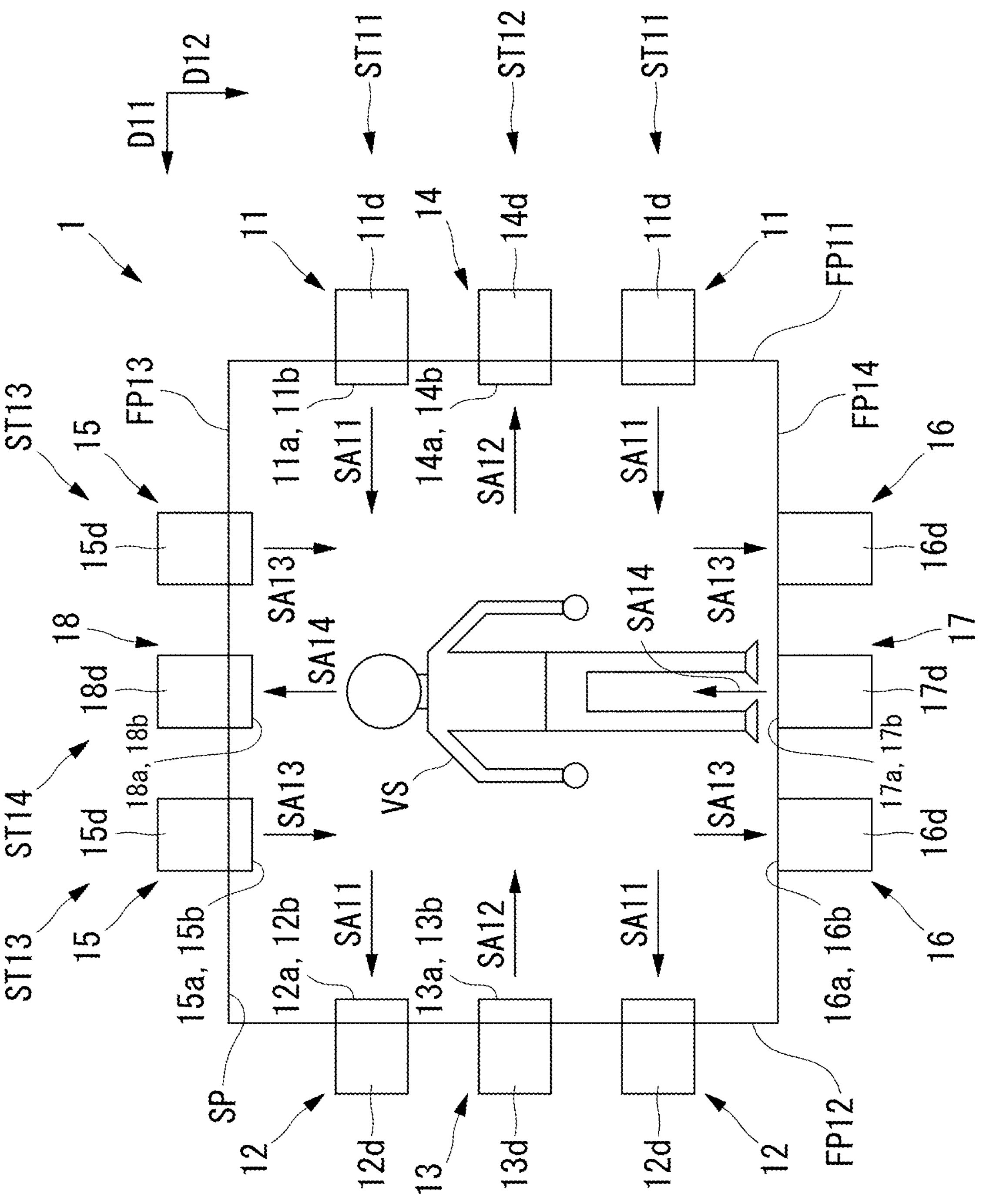
FIG. 1 is a front view schematically illustrating an example of a configuration of an air shower apparatus according to an embodiment.

Hereinafter, embodiments and modifications of the present invention will be described with reference to the drawings.

Note that the disclosure is merely an example, and appropriate modifications that can be easily conceived by those skilled in the art while maintaining the gist of the invention are naturally included in the scope of the present invention. In addition, in order to make the description clearer, the drawings may schematically represent the width, thickness, shape, and the like of each part as compared with aspects of the embodiments, but they are merely examples and do not limit the interpretation of the present invention.

In addition, in the present specification and each drawing, elements similar to those described before with respect to previously described drawings may be denoted by the same reference numerals, and detailed description thereof may be appropriately omitted.

Furthermore, in the drawings used in the embodiments, hatching may be omitted to make the drawings easily viewable even in a cross-sectional view. In addition, even in a plan view, hatching may be applied to make the drawings easily viewable.

Note that, in the following embodiments, when a range is indicated as A to B, A or more and B or less is indicated unless otherwise specified.

EMBODIMENTS

<Air Shower Apparatus>

Figure 2:
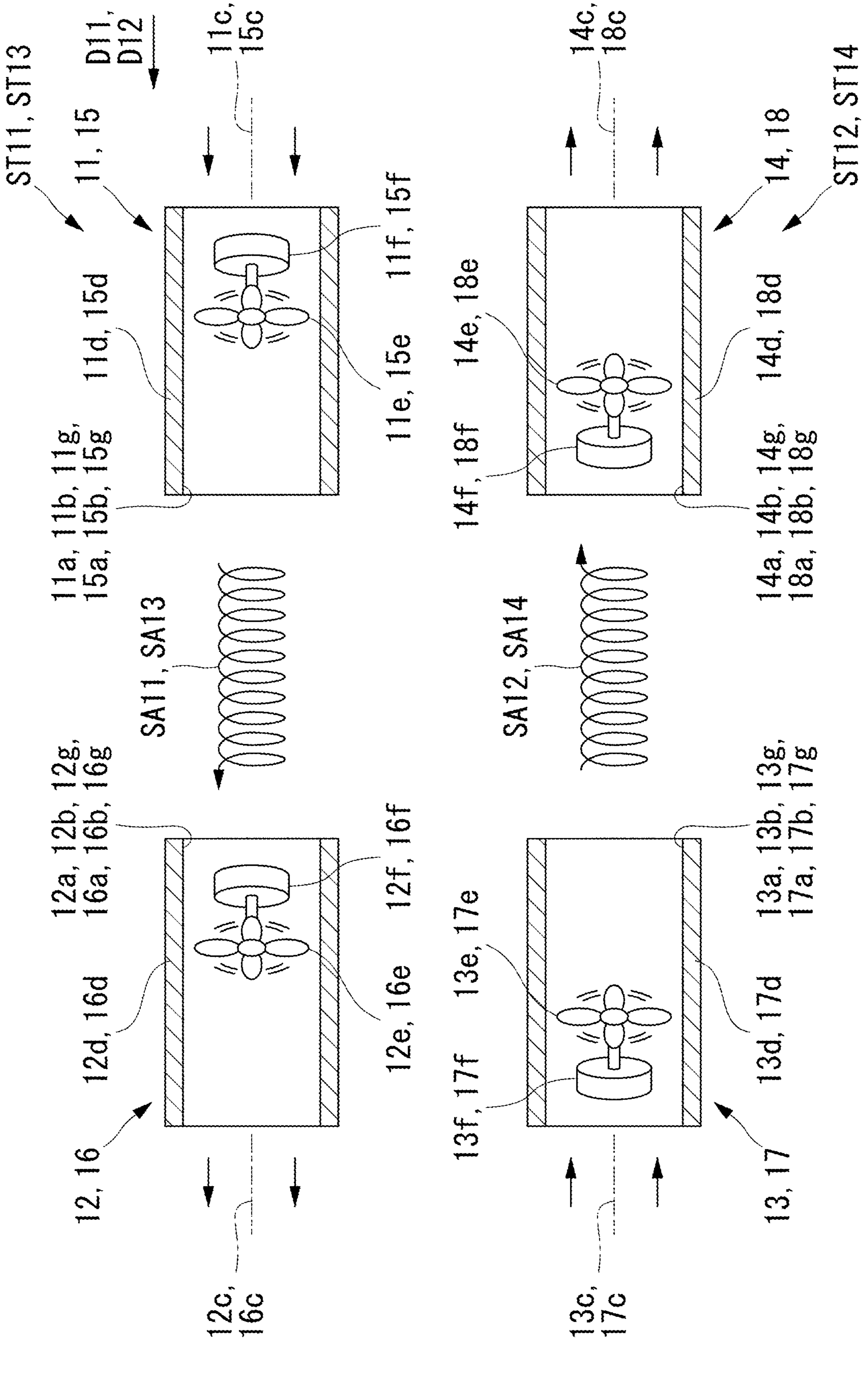
FIG. 2 is a cross-sectional view schematically illustrating parts of the air shower apparatus according to the embodiment.
Figure 3:
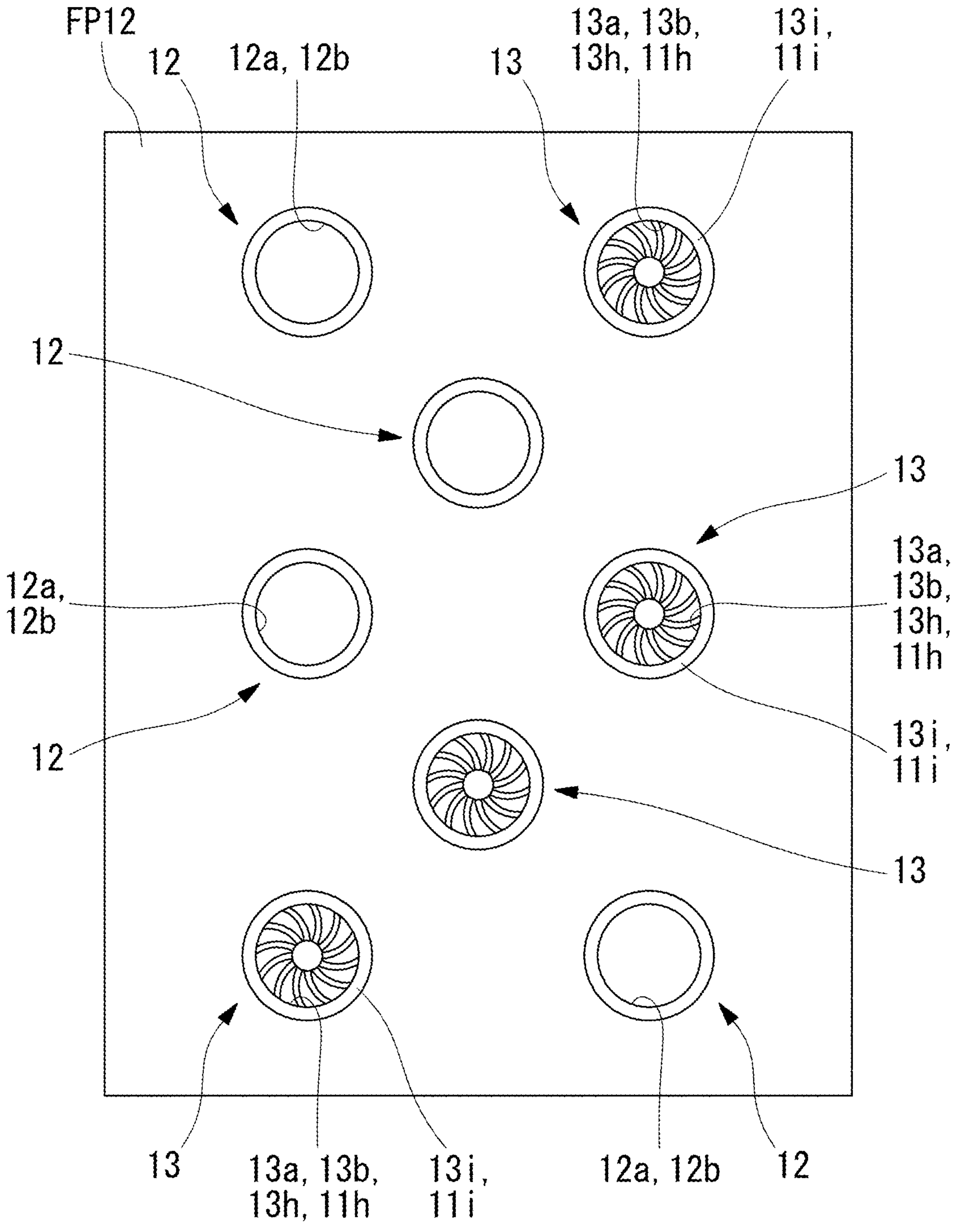
FIG. 3 is a diagram schematically illustrating an example of the configuration of the air shower apparatus according to the embodiment.
Figure 4:
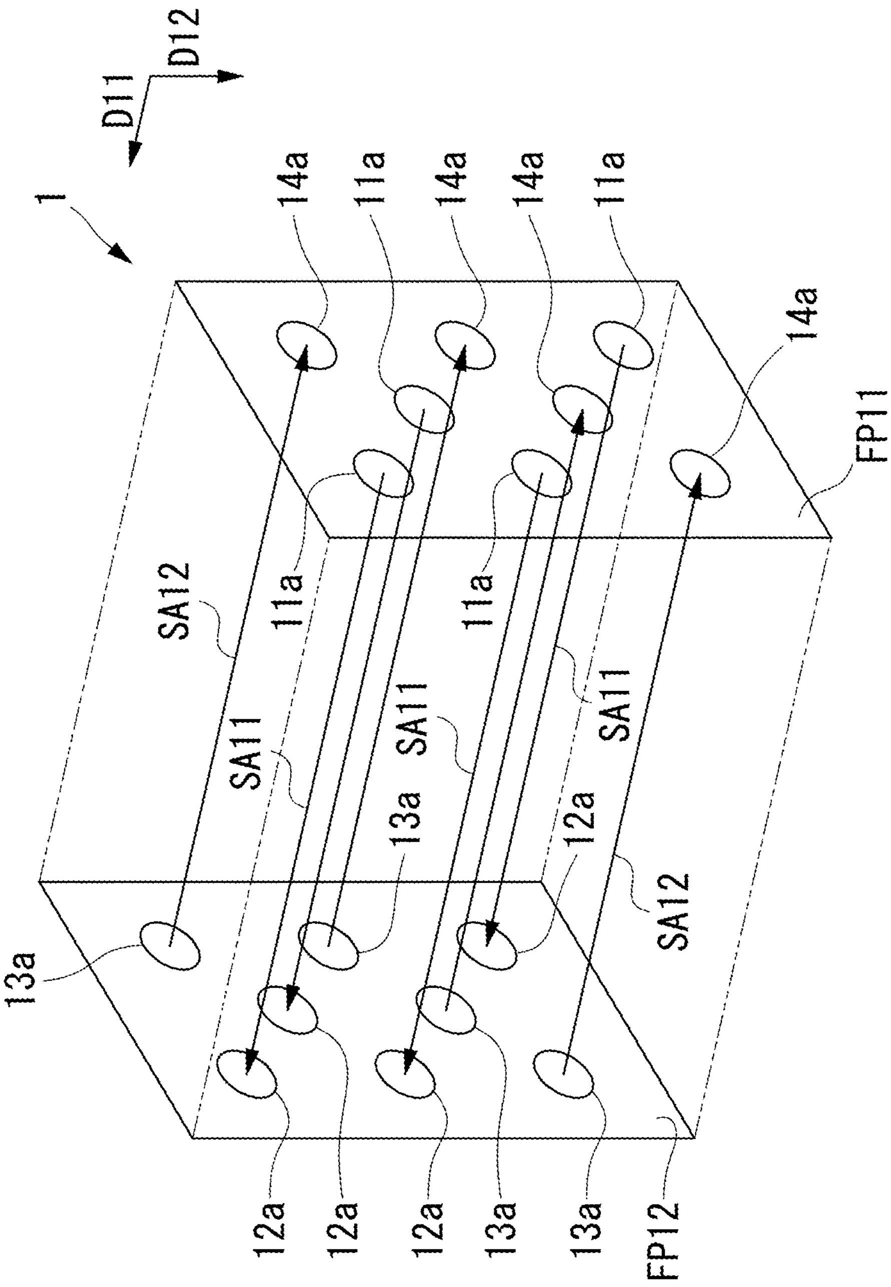
FIG. 4 is a perspective view schematically illustrating an example of the configuration of the air shower apparatus according to the embodiment.
Figure 5:
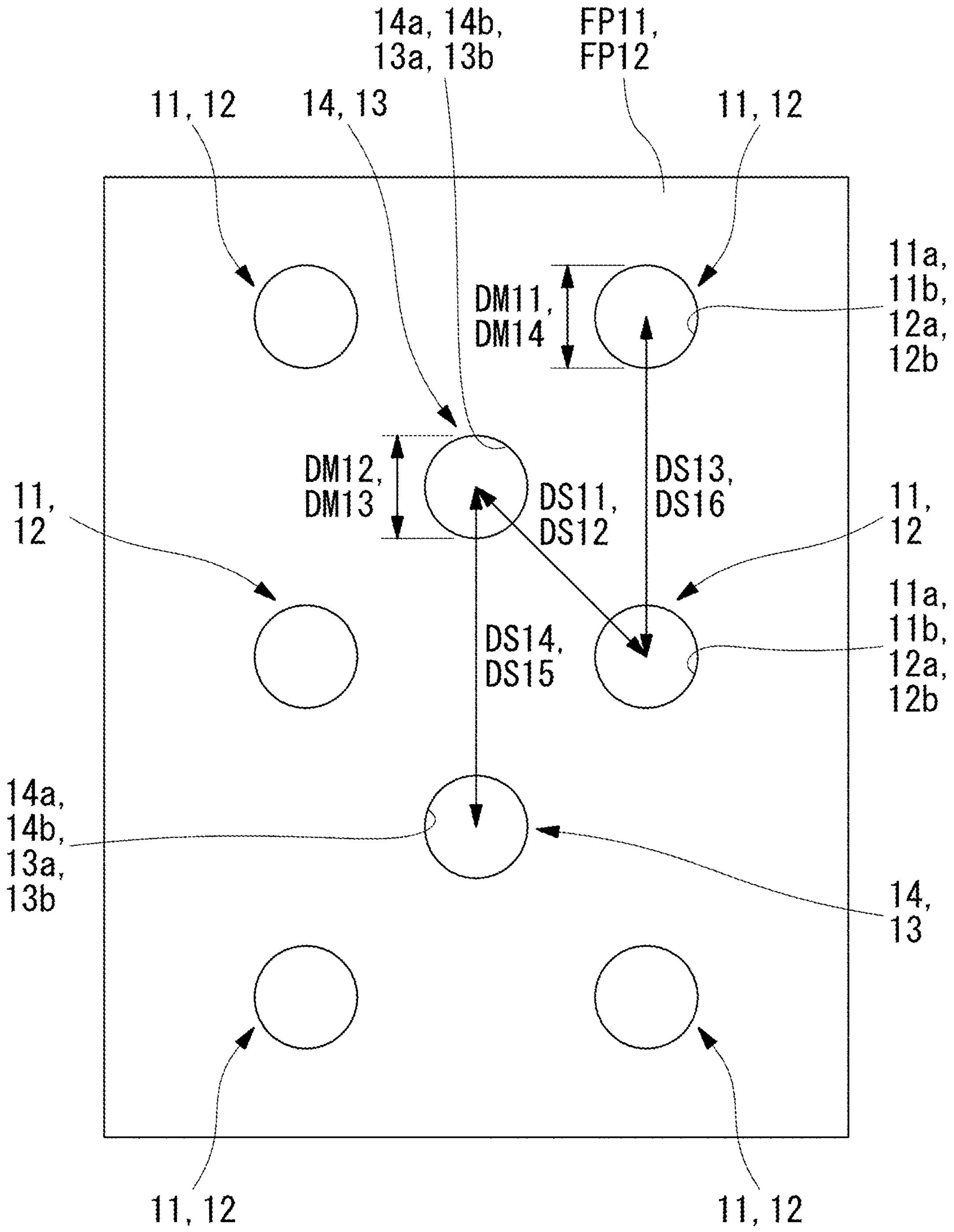
FIG. 5 is a diagram schematically illustrating another example of the configuration of the air shower apparatus according to the embodiment.

An air shower apparatus according to an embodiment of the present invention will be described. FIG. 1 is a front view schematically illustrating an example of a configuration of an air shower apparatus according to an embodiment. FIG. 2 is a cross-sectional view schematically illustrating parts of the air shower apparatus according to the embodiment. FIG. 3 is a diagram schematically illustrating an example of the configuration of the air shower apparatus according to the embodiment. FIG. 4 is a perspective view schematically illustrating an example of the configuration of the air shower apparatus according to the embodiment. FIG. 5 is a diagram schematically illustrating another example of the configuration of the air shower apparatus according to the embodiment.

Note that FIG. 2 illustrates a set ST11 or a set ST13 formed by one blower 11 or blower 15 and one blower 12 or blower 16 in an air shower apparatus 1 illustrated in FIG. 1. In addition, FIG. 2 illustrates a set ST12 or a set ST14 formed by one blower 13 or blower 17 and one blower 14 or blower 18 in the air shower apparatus 1 illustrated in FIG. 1. In addition, in FIGS. 1, 2, and 4, the directions of the airflows are indicated by arrows (the same applies to FIGS. 6 and 7 described later).

As illustrated in FIGS. 1 to 4, the air shower apparatus 1 according to the present embodiment includes a face portion FP11 and a face portion FP12 disposed to face each other in a direction D11, and generates an air shower inside a space SP between the face portion FP11 and the face portion FP12. The air shower apparatus 1 includes a plurality of blowers (circulators) 11 and a plurality of blowers (circulators) 12. Note that the direction D11 in FIG. 1 is a horizontal direction, and a direction D12 intersecting and preferably orthogonal to the direction D11 in FIG. 1 is a vertical direction.

The plurality of blowers 11 are provided in the face portion FP11, and each includes a blow-out port 11*a*, that is, an opening 11*b* through which air is blown out. The plurality of blowers 12 are provided in the face portion FP12, and each includes a suction port 12*a*, that is, an opening 12*b* through which air is sucked, and the suction port 12*a* is disposed to face the blow-out port 11*a* included in each of the plurality of blowers 11. Note that each of the face portion FP11 and the face portion FP12 is a side face portion, a face portion FP13 to be described later is a ceiling face portion, and a face portion FP14 to be described later is a floor face portion.

Specifically, each of the plurality of blowers 11 can include a cylindrical portion 11*d* centered on a central axis 11*c* along the direction D11, a fan 11*e* provided rotatably about the central axis 11*c* inside the cylindrical portion 11*d*, and a drive unit 11*f* that rotationally drives the fan 11*e* in a first rotational direction that is a clockwise or counterclockwise rotational direction. In such a case, the blow-out port 11*a* is provided at an end portion 11*g* of the cylindrical portion 11*d* on the face portion FP12 side in the direction along the direction D11. The fan 11*e* sucks air from the side opposite to the end portion 11*g* of the cylindrical portion 11*d* and blows out the sucked air from the blow-out port 11*a*.

In addition, each of the plurality of blowers 12 can include a cylindrical portion 12*d* centered on a central axis 12*c* along the direction D11, a fan 12*e* provided rotatably about the central axis 12*c* inside the cylindrical portion 12*d*, and a drive unit 12*f* that rotationally drives the fan 12*e* in a second rotational direction that is a clockwise or counterclockwise rotational direction. In such a case, the suction port 12*a* is provided at an end portion 12*g* of the cylindrical portion 12*d* on the face portion FP11 side in the direction along the direction D11. The fan 12*e* sucks air from the suction port 12*a* and blows out the air sucked from the suction port 12*a* from the side opposite to the end portion 12*g* of the cylindrical portion 12*d*.

In the present embodiment, for each of the plurality of blowers 11, a set ST11 is formed by a blower 11 and a blower 12 which is one of the plurality of blowers 12 and includes the suction port 12*a* disposed to face the blow-out port 11*a* included in the blower 11.

In the set ST11 of the blower 11 and the blower 12, the blower 11 blows out a spiral airflow SA11 from the blow-out port 11*a* included in the blower 11 toward the suction port 12*a* included in the blower 12. In addition, in the set of the blower 11 and the blower 12, the blower 12 sucks the spiral airflow SA11 blown out by the blower 11 from the blow-out port 11*a* included in the blower 11 toward the suction port 12*a* included in the blower 12 from the suction port 12*a* included in the blower 12.

In addition, the air shower apparatus 1 according to the present embodiment generates the air shower inside the space SP by the plurality of spiral airflows SA11 blown out from the plurality of blow-out ports 11*a* included in each of the plurality of blowers 11.

Here, problems in generating the air shower by the air shower apparatus will be described.

Most of the air shower apparatuses currently used in clean rooms and the like are air shower apparatuses that discharge air from multiple directions all at once, such as directions facing each other, and exhaust the discharged air from a direction irrelevant to the directions in which the air is discharged. Thus, there is a problem that the airflow (convection) is disturbed, and dust and dirt adhering to clothes of a person entering a clean room or the like are likely to fly around in the space of the air shower chamber.

In addition, there is a problem that it is difficult to easily install the air shower apparatus in a store, an office, a commercial facility, or the like because there is a high possibility that the airflow is disturbed and dust is scattered around, and the air shower apparatus is large-scale equipment used in a clean room or the like.

In the technique described in JP 2004-176597 A, when the airflow direction changing body is rotationally driven by the rotational force obtained by the blades, the air flowing in from the blower is spirally discharged while the direction of the air being changed by the airflow direction changing body. However, in the technique described in JP 2004-176597 A, when an operator entering a clean room enters an air shower chamber, air is discharged from wall surfaces on both sides of the air shower chamber, that is, from multiple directions all at once, and the discharged air is exhausted from a direction irrelevant to the directions in which the air is discharged, and thus there is a problem that the airflow is easily disturbed.

In the technique described in JP H07-32439 U, a spiral member is provided in an air jet nozzle supported by a holder in a large number of air injection ports provided in partition walls that partitions air purification chambers located on both sides of a shower chamber and the shower chamber. However, in the technique described in JP H07-32439 U, air is discharged from both sides of the shower chamber, that is, from multiple directions all at once, and the discharged air is exhausted from a direction irrelevant to the directions in which the air is discharged, and thus there is a problem that the airflow is easily disturbed.

On the other hand, the air shower apparatus 1 according to the present embodiment includes the face portion FP11 and the face portion FP12 disposed to face each other in the direction D11, the plurality of blowers 11 provided in the face portion FP11, and the plurality of blowers 12 provided in the face portion FP12, and each suction port 12*a* included in each blower 12 is disposed to face each blow-out port 11*a* included in each blower 11. In addition, in the set ST11 of the blower 11 and the blower 12, the blower 11 blows out the spiral airflow SA11 from the blow-out port 11*a* included in the blower 11 toward the suction port 12*a* included in the blower 12, and the blower 12 sucks the spiral airflow SA11 blown out by the blower 11 from the suction port 12*a*. In addition, the plurality of spiral airflows SA11 blown out from the plurality of blow-out ports 11*a* included in the plurality of blowers 11 form the air shower inside the space SP between the face portion FP11 and the face portion FP12.

When the spiral airflow SA11 having a spiral shape is blown out from the blow-out port 11*a*, the airflow is more likely to travel straight without spreading than when an airflow having a shape other than the spiral shape is blown out. That is, the straightness of the spiral airflow SA11 is higher than the straightness of an airflow having a shape other than the spiral shape. In addition, the suction port 12*a* through which the spiral airflow SA11 is sucked is disposed to face the blow-out port 11*a* through which the spiral airflow SA11 is blown out.

In such a case, the air discharged by blowing out the plurality of spiral airflows SA11 from the plurality of blow-out ports 11*a* included in each of the plurality of blowers 11 is exhausted in the same direction as the discharged direction. Thus, the airflow (convection) can be prevented or suppressed from being disturbed, and dust and dirt adhering to the clothes of the person VS entering the clean room or the like can be prevented or suppressed from flying around in the space SP of the air shower chamber.

In addition, the positions of the blow-out ports of the blowers and the positions of the suction ports of the blowers correspond one-to-one. Thus, when a person entering a clean space such as a clean room passes through the entrance, dust, dirt, and the like can be blown off at the entrance, and it is possible to reduce the turbulence of the airflow of the air blown into the air shower chamber from the blow-out ports and sucked into the suction ports from the inside of the air shower chamber.

In addition, because the possibility that the airflow is disturbed and dust is scattered around is less than before, the air shower apparatus can be easily installed and used in a store, an office, a commercial facility, or the like. In addition, conventionally, the air shower apparatus is large-scale equipment used in a clean room or the like, but according to the air shower apparatus according to the present embodiment, a cheaper air shower apparatus can be achieved, and the air shower apparatus can be easily used even if it is not heavy equipment. Furthermore, it is possible to blow off pollen or the like adhering to clothes of a person entering a room in a store, an office, a commercial facility, or the like from the outside, and it is also effective as a countermeasure against pollinosis.

That is, the airflow inside the air shower chamber can be prevented or suppressed from being disturbed, and the air shower apparatus can be easily installed and used.

As illustrated in FIGS. 1 to 4, the air shower apparatus 1 preferably includes a plurality of blowers (circulators) 13 and a plurality of blowers (circulators) 14.

The plurality of blowers 13 are provided in the face portion FP12, and each includes a blow-out port 13*a*, that is, an opening 13*b* through which air is blown out. The plurality of blowers 14 are provided in the face portion FP11, and each includes a suction port 14*a*, that is, an opening 14*b* through which air is sucked, and the suction port 14*a* is disposed to face the blow-out port 13*a* included in each of the plurality of blowers 13.

Specifically, each of the plurality of blowers 13 can include a cylindrical portion 13*d* centered on a central axis 13*c* along the direction D11, a fan 13*e* provided rotatably about the central axis 13*c* inside the cylindrical portion 13*d*, and a drive unit 13*f* that rotationally drives the fan 13*e* in a third rotational direction that is a clockwise or counterclockwise rotational direction. In such a case, the blow-out port 13*a* is provided at an end portion 13*g* of the cylindrical portion 13*d* on the face portion FP11 side in the direction along the direction D11. The fan 13*e* sucks air from the side opposite to the end portion 13*g* of the cylindrical portion 13*d* and blows out the sucked air from the blow-out port 13*a*.

In addition, each of the plurality of blowers 14 can include a cylindrical portion 14*d* centered on a central axis 14*c* along the direction D11, a fan 14*e* provided rotatably about the central axis 14*c* inside the cylindrical portion 14*d*, and a drive unit 14*f* that rotationally drives the fan 14*e* in a fourth rotational direction that is a clockwise or counterclockwise rotational direction. In such a case, the suction port 14*a* is provided at an end portion 14*g* of the cylindrical portion 14*d* on the face portion FP12 side in the direction along the direction D11. The fan 14*e* sucks air from the suction port 14*a* and blows out the air sucked from the suction port 14*a* from the side opposite to the end portion 14*g* of the cylindrical portion 14*d*.

In addition, for each of the plurality of blowers 13, a set ST12 is formed by a blower 13 and a blower 14 which is one of the plurality of blowers 14 and includes the suction port 14*a* disposed to face the blow-out port 13*a* included in the blower 13.

In the set ST12 of the blower 13 and the blower 14, the blower 13 blows out a spiral airflow SA12 from the blow-out port 13*a* included in the blower 13 toward the suction port 14*a* included in the blower 14. In addition, in the set ST12 of the blower 13 and the blower 14, the blower 14 sucks the spiral airflow SA12 blown out by the blower 13 from the blow-out port 13*a* included in the blower 13 toward the suction port 14*a* included in the blower 14 from the suction port 14*a* included in the blower 14.

In addition, the air shower apparatus 1 according to the present embodiment generates the air shower inside the space SP by the plurality of spiral airflows SA12 blown out from the plurality of blow-out ports 13*a* included in each of the plurality of blowers 13.

In such a case, the airflow (convection) can be prevented or suppressed from being disturbed even when the plurality of spiral airflows SA11 are blown out from the plurality of blow-out ports 11*a*, and the airflow (convection) can be prevented or suppressed from being disturbed even when the plurality of spiral airflows SA12 are blown out from the plurality of blow-out ports 13*a*. Thus, it is possible to blow air not only to the portions facing the face portion FP11 but also to the portions facing the face portion FP12 in the clothes of the person VS entering the clean room or the like, and it is possible to efficiently remove dust and dirt adhering to the clothes of the entering person VS.

As illustrated in FIGS. 2 to 4, preferably, each of the plurality of blow-out ports 11*a* included in each of the plurality of blowers 11 is disposed at a position so as not to overlap any of the plurality of blow-out ports 13*a* included in each of the plurality of blowers 13, that is, so as not to overlap any of the plurality of blow-out ports 13*a* when viewed from the direction D11. In addition, each of the plurality of suction ports 12*a* included in each of the plurality of blowers 12 is disposed at a position so as not to overlap any of the plurality of suction ports 14*a* included in each of the plurality of blowers 14, that is, so as not to overlap any of the plurality of suction ports 14*a* when viewed from the direction D11.

In such a case, the spiral airflows SA11 blown out from the plurality of blow-out ports 11*a* and the spiral airflows SA12 blown out from the plurality of blow-out ports 13*a* can be prevented or suppressed from coming into contact with each other. Thus, it is possible to prevent or suppress the airflow from being disturbed, and it is possible to prevent or suppress dust and dirt adhering to the clothes of the person VS entering the clean room or the like from flying around in the space of the air shower chamber.

That is, the plurality of blow-out ports 11*a*, that is, the openings 11*b*, the plurality of suction ports 12*a*, that is, the openings 12*b*, the plurality of blow-out ports 13*a*, that is, the openings 13*b*, and the plurality of suction ports 14*a*, that is, the openings 14*b* are disposed such that any two of the plurality of spiral airflows SA11 and the plurality of spiral airflows SA12 do not come into contact with each other (the same applies to a plurality of openings 21*b*, a plurality of openings 22*b*, a plurality of openings 23*b*, a plurality of openings 24*b*, a plurality of spiral airflows SA21, a plurality of spiral airflows SA22, and a plurality of spiral airflows SA23 described in a modification of the embodiment described later).

Note that, in the set ST11 of the blower 11 and the blower 12, the blow-out port 11*a* and the suction port 12*a* are disposed so as to overlap each other when viewed from the direction D11. In addition, in the set ST12 of the blower 13 and the blower 14, the blow-out port 13*a* and the suction port 14*a* are disposed so as to overlap each other when viewed from the direction D11.

As illustrated in FIG. 5, a diameter of each of the plurality of blow-out ports 11*a*, that is, the plurality of openings 11*b* is defined as a diameter DM11, and a diameter of each of the plurality of suction ports 14*a*, that is, the plurality of openings 14*b* is defined as a diameter DM12. In this case, preferably, when viewed in the direction D11 (see FIG. 2), a center-to-center distance DS11 between the blow-out port 11*a* and the suction port 14*a* adjacent to each other is larger than both of twice the diameter DM11 and twice the diameter DM12. As a result, the blow-out port 11*a* and the suction port 14*a* can be separated from each other by a distance equal to or greater than any of the diameters, and the spiral airflow SA11 (see FIG. 2) and the spiral airflow SA12 (see FIG. 2) can be sufficiently separated from each other.

In addition, a diameter of each of the plurality of blow-out ports 13*a*, that is, the plurality of openings 13*b* is defined as a diameter DM13, and a diameter of each of the plurality of suction ports 12*a*, that is, the plurality of openings 12*b* is defined as a diameter DM14. In this case, preferably, when viewed in the direction D11 (see FIG. 2), a center-to-center distance DS12 between the blow-out port 13*a* and the suction port 12*a* adjacent to each other is larger than both of twice the diameter DM13 and twice the diameter DM14. As a result, the blow-out port 13*a* and the suction port 12*a* can be separated from each other by a distance equal to greater than any of the diameters, and the spiral airflow SA11 (see FIG. 2) and the spiral airflow SA12 (see FIG. 2) can be sufficiently separated from each other.

Alternatively, as illustrated in FIG. 5, preferably, when viewed from the direction D11 (see FIG. 2), the center-to-center distance DS11 between the blow-out port 11*a* and the suction port 14*a* adjacent to each other is smaller than a center-to-center distance DS13 between the two blow-out ports 11*a* adjacent to each other, and is smaller than a center-to-center distance DS14 between the two suction ports 14*a* adjacent to each other. Even in such a case, the spiral airflow SA11 (see FIG. 2) and the spiral airflow SA12 (see FIG. 2) can be sufficiently separated from each other.

In addition, preferably, when viewed from the direction D11 (see FIG. 2), the center-to-center distance DS12 between the blow-out port 13*a* and the suction port 12*a* adjacent to each other is smaller than a center-to-center distance DS15 between the two blow-out ports 13*a* adjacent to each other and smaller than a center-to-center distance DS16 between the two suction ports 12*a* adjacent to each other. Even in such a case, the spiral airflow SA11 (see FIG. 2) and the spiral airflow SA12 (see FIG. 2) can be sufficiently separated from each other.

As illustrated in FIGS. 1 to 4, preferably, the air shower apparatus 1 according to the present embodiment includes a face portion FP13 and a face portion FP14 disposed to face each other in the direction D12 intersecting, preferably orthogonal to, the direction D11, and generates the air shower inside the space SP between the face portion FP13 and the face portion FP14. The air shower apparatus 1 includes a plurality of blowers (circulators) 15, a plurality of blowers (circulators) 16, a plurality of blowers (circulators) 17, and a plurality of blowers (circulators) 18. Note that, in such a case, the air shower apparatus 1 according to the present embodiment may include only the plurality of blowers 11 and the plurality of blowers 12, and may not include the plurality of blowers 13 and the plurality of blowers 14.

The plurality of blowers 15 are provided in the face portion FP13, and each includes a blow-out port 15*a*, that is, an opening 15*b* through which air is blown out. The plurality of blowers 16 are provided in the face portion FP14, and each includes a suction port 16*a*, that is, an opening 16*b* through which air is sucked, and the suction port 16*a* is disposed to the face the blow-out port 15*a* included in each of the plurality of blowers 15.

The plurality of blowers 17 are provided in the face portion FP14, and each includes a blow-out port 17*a*, that is, an opening 17*b* through which air is blown out. The plurality of blowers 18 are provided in the face portion FP13, and each includes a suction port 18*a*, that is, an opening 18*b* through which air is sucked, and the suction port 18*a* is disposed to face the blow-out port 17*a* included in each of the plurality of blowers 17.

Specifically, each of the plurality of blowers 15 can include a cylindrical portion 15*d* centered on a central axis 15*c* along the direction D12, a fan 15*e* provided rotatably about the central axis 15*c* inside the cylindrical portion 15*d*, and a drive unit 15*f* that rotationally drives the fan 15*e* in a fifth rotational direction that is a clockwise or counterclockwise rotational direction. In such a case, the blow-out port 15*a* is provided at an end portion 15*g* of the cylindrical portion 15*d* on the face portion FP14 side in the direction along the direction D12. The fan 15*e* sucks air from the side opposite to the end portion 15*g* of the cylindrical portion 15*d* and blows out the sucked air from the blow-out port 15*a*.

In addition, each of the plurality of blowers 16 can include a cylindrical portion 16*d* centered on a central axis 16*c* along the direction D12, a fan 16*e* provided rotatably about the central axis 16*c* inside the cylindrical portion 16*d*, and a drive unit 16*f* that rotationally drives the fan 16*e* in a sixth rotational direction that is a clockwise or counterclockwise rotational direction. In such a case, the suction port 16*a* is provided at an end portion 16*g* of the cylindrical portion 16*d* on the face portion FP13 side in the direction along the direction D12. The fan 16*e* sucks air from the suction port 16*a* and blows out the air sucked from the suction port 16*a* from the side opposite to the end portion 16*g* of the cylindrical portion 16*d*.

In addition, each of the plurality of blowers 17 can include a cylindrical portion 17*d* centered on a central axis 17*c* along the direction D12, a fan 17*e* provided rotatably about the central axis 17*c* inside the cylindrical portion 17*d*, and a drive unit 17*f* that rotationally drives the fan 17*e* in a seventh rotational direction that is a clockwise or counterclockwise rotational direction. In such a case, the blow-out port 17*a* is provided at an end portion 17*g* of the cylindrical portion 17*d* on the face portion FP13 side in the direction along the direction D12. The fan 17*e* sucks air from the side opposite to the end portion 17*g* of the cylindrical portion 17*d* and blows out the sucked air from the blow-out port 17*a*.

In addition, each of the plurality of blowers 18 can include a cylindrical portion 18*d* centered on a central axis 18*c* along the direction D12, a fan 18*e* provided rotatably about the central axis 18*c* inside the cylindrical portion 18*d*, and a drive unit 18*f* that rotationally drives the fan 18*e* in an eighth rotational direction which is a clockwise or counterclockwise rotational direction. In such a case, the suction port 18*a* is provided at an end portion 18*g* of the cylindrical portion 18*d* on the face portion FP14 side in the direction along the direction D12. The fan 18*e* sucks air from the suction port 18*a* and blows out the air sucked from the suction port 18*a* from the side opposite to the end portion 18*g* of the cylindrical portion 18*d*.

In addition, for each of the plurality of blowers 15, a set ST13 is formed by a blower 15 and a blower 16 which is one of the plurality of blowers 16 and includes the suction port 16*a* disposed to face the blow-out port 15*a* included in the blower 15. In addition, for each of the plurality of blowers 17, a set ST14 is formed by a blower 17 and a blower 18 which is one of the plurality of blowers 18 and includes the suction port 18*a* disposed to face the blow-out port 17*a* included in the blower 17.

In the set ST13 of the blower 15 and the blower 16, the blower 15 blows out a spiral airflow SA13 from the blow-out port 15*a* included in the blower 15 toward the suction port 16*a* included in the blower 16. In addition, in the set ST13 of the blower 15 and the blower 16, the blower 16 sucks the spiral airflow SA13 blown out by the blower 15 from the blow-out port 15*a* included in the blower 15 toward the suction port 16*a* included in the blower 16 from the suction port 16*a* included in the blower 16.

In the set ST14 of the blower 17 and the blower 18, the blower 17 blows out a spiral airflow SA14 from the blow-out port 17*a* included in the blower 17 toward the suction port 18*a* included in the blower 18. In addition, in the set ST14 of the blower 17 and the blower 18, the blower 18 sucks the spiral airflow SA14 blown out by the blower 17 from the blow-out port 17*a* included in the blower 17 toward the suction port 18*a* included in the blower 18 from the suction port 18*a* included in the blower 18.

In addition, the air shower apparatus 1 according to the present embodiment generates the air shower inside the space SP by the plurality of spiral airflows SA13 blown out from the plurality of blow-out ports 15*a* included in each of the plurality of blowers 15 and the plurality of spiral airflows SA14 blown out from the plurality of blow-out ports 17*a* included in each of the plurality of blowers 17.

In such a case, the airflow (convection) can be prevented or suppressed from being disturbed even when the plurality of spiral airflows SA13 are blown out from the plurality of blow-out ports 15*a*, and the airflow (convection) can be prevented or suppressed from being disturbed even when the plurality of spiral airflows SA14 are blown out from the plurality of blow-out ports 17*a*. Thus, it is possible to blow air to portions facing the face portion FP13 and portions facing the face portion FP14 in the clothes of the person VS entering the clean room or the like, and it is possible to efficiently remove dust and dirt adhering to the clothes of the entering person VS.

Note that, in the case of being installed not at an entrance of a store, an office, a commercial facility, or the like but at an entrance to a clean space maintained in a clean environment such as a clean room, for example, by providing partition walls in a gate shape inside a box-shaped main body case (not illustrated), the inside of the main body case can be partitioned into an air shower chamber also serving as a passage penetrating the central portion from the front side to the back side and air purification chambers located on both sides of the air shower chamber. At this time, any three face portions of the face portion FP11, the face portion FP12, the face portion FP13, and the face portion FP14 correspond to the partition walls. In addition, the air shower chamber and the air purification chambers communicate with each other by the blow-out ports, that is, the openings, and the suction ports, that is, the openings, provided in the partition walls.

In addition, preferably, the plurality of blow-out ports 15*a*, that is, the openings 15*b*, the plurality of suction ports 16*a*, that is, the openings 16*b*, the plurality of blow-out ports 17*a*, that is, the openings 17*b*, and the plurality of suction ports 18*a*, that is, the openings 18*b* are disposed such that any two of the plurality of spiral airflows SA11 and the plurality of spiral airflows SA12 substantially along the horizontal direction and the plurality of spiral airflows SA13 and the plurality of spiral airflows SA14 substantially along the vertical direction do not come into contact with each other (the same applies to a modification of the embodiment described later).

In addition, although FIG. 3 illustrates blowers 13 as representatives of the blowers 11 and the blowers 13, preferably, each of the plurality of blowers 11 (see FIG. 5) includes a grille 11*i* provided in the blow-out port 11*a*, that is, the opening 11*b* (see FIG. 5) and formed with a plurality of holes 11*h* each having a spiral shape swirling clockwise or counterclockwise when viewed from the direction D11 (see FIG. 2). Each of the plurality of holes 11*h* penetrates the grille 11*i* in the direction D11. Note that, as described above, in FIG. 3, the holes 13*h* are indicated as the holes 11*h*, and the grilles 13*i* are indicated as the grilles 11*i*.

In a case where each of the plurality of holes 11*h* formed in the grille 11*i* has a spiral shape swirling clockwise or counterclockwise, the spiral airflow SA11 having a spiral shape can be easily blown out as compared with a case where the plurality of holes 11*h* formed in the grille 11*i* does not have a spiral shape swirling clockwise or counterclockwise. Note that, when viewed from the blower 12 toward the blower 11, the rotational direction of the spiral shape of the holes 11*h* formed in the grille 11*i*, the rotational direction of the spiral airflow SA11 blown out by the blower 11, and the rotational direction of the fan 11*e* are the same rotational direction. In addition, the plurality of blowers 15 can also be configured similarly to the plurality of blowers 11 except that the plurality of blowers 15 have a spiral shape when viewed from the direction D12 instead of the direction D11.

In addition, as illustrated in FIG. 3, each of the plurality of blowers 13 includes a grille 13*i* provided in the blow-out port 13*a*, that is, the opening 13*b*, and formed with a plurality of holes 13*h* each having a spiral shape swirling clockwise or counterclockwise when viewed from the direction D11. Each of the plurality of holes 13*h* penetrates the grille 13*i* in the direction D11.

When each of the plurality of holes 13*h* formed in the grille 13*i* has a spiral shape swirling clockwise or counterclockwise, the spiral airflow SA12 having a spiral shape can be easily blown out as compared with a case where the plurality of holes 13*h* formed in the grille 13*i* does not have a spiral shape swirling clockwise or counterclockwise. Note that, when viewed from the blower 14 toward the blower 13, the rotational direction of the spiral shape of the holes 13*h* formed in the grille 13*i*, the rotational direction of the spiral airflow SA12 blown out by the blower 13, and the rotational direction of the fan 13*e* are the same rotational direction. In addition, the plurality of blowers 17 can also be configured similarly to the plurality of blowers 13 except that the plurality of blowers 17 have a spiral shape when viewed from the direction D12 instead of the direction D11.

<Modification of Air Shower Apparatus>

Next, a modification of the air shower apparatus according to the embodiment will be described. In an air shower apparatus 1*a* according to the present modification, it is possible to switch between blowing out a spiral airflow SA22 from an opening 23*b* toward an opening 24*b* and blowing out a spiral airflow SA23 from an opening 24*b* toward an opening 23*b*.

Figure 6:
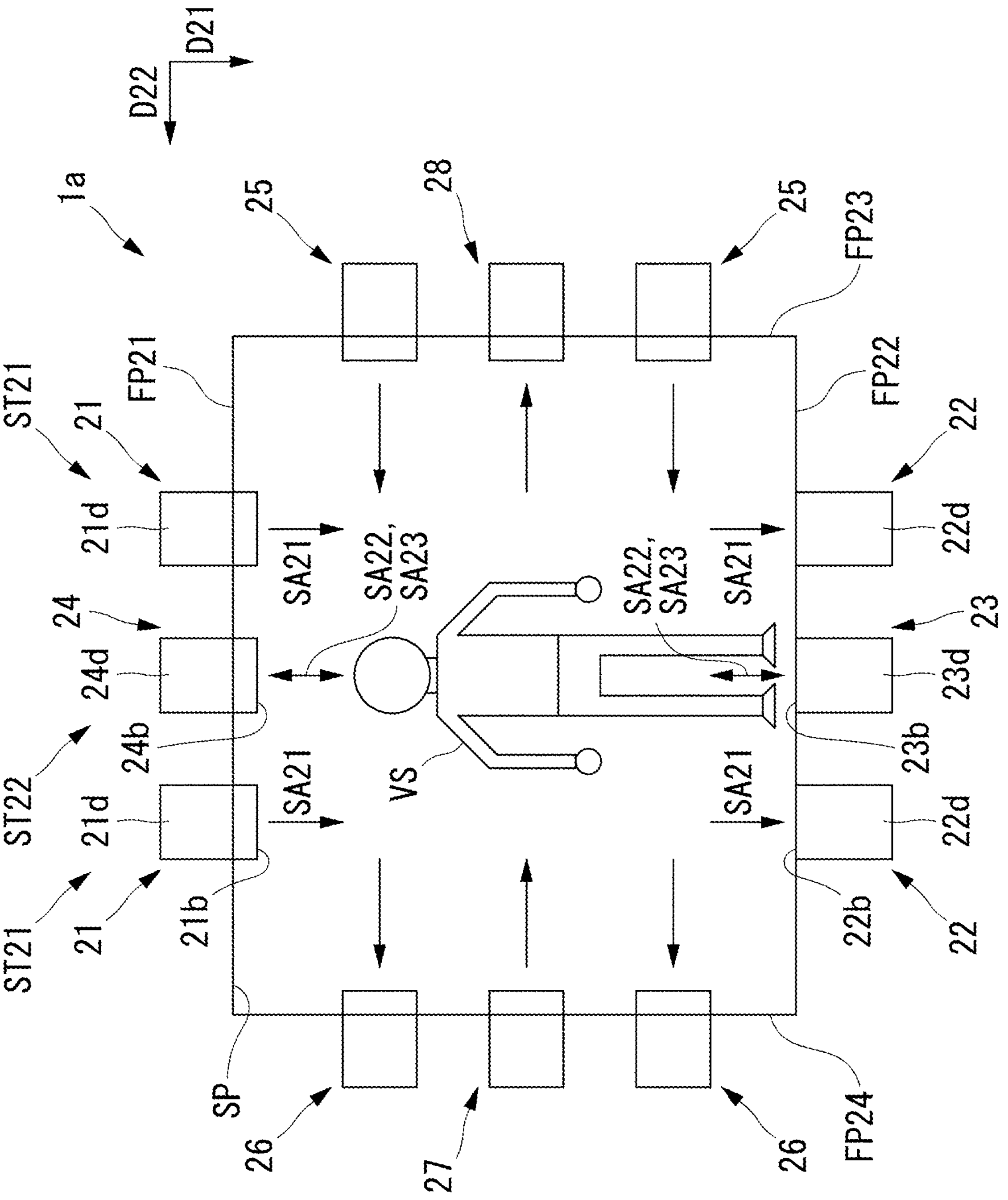
FIG. 6 is a front view schematically illustrating a configuration of an air shower apparatus according to a modification of the embodiment.
Figure 7:
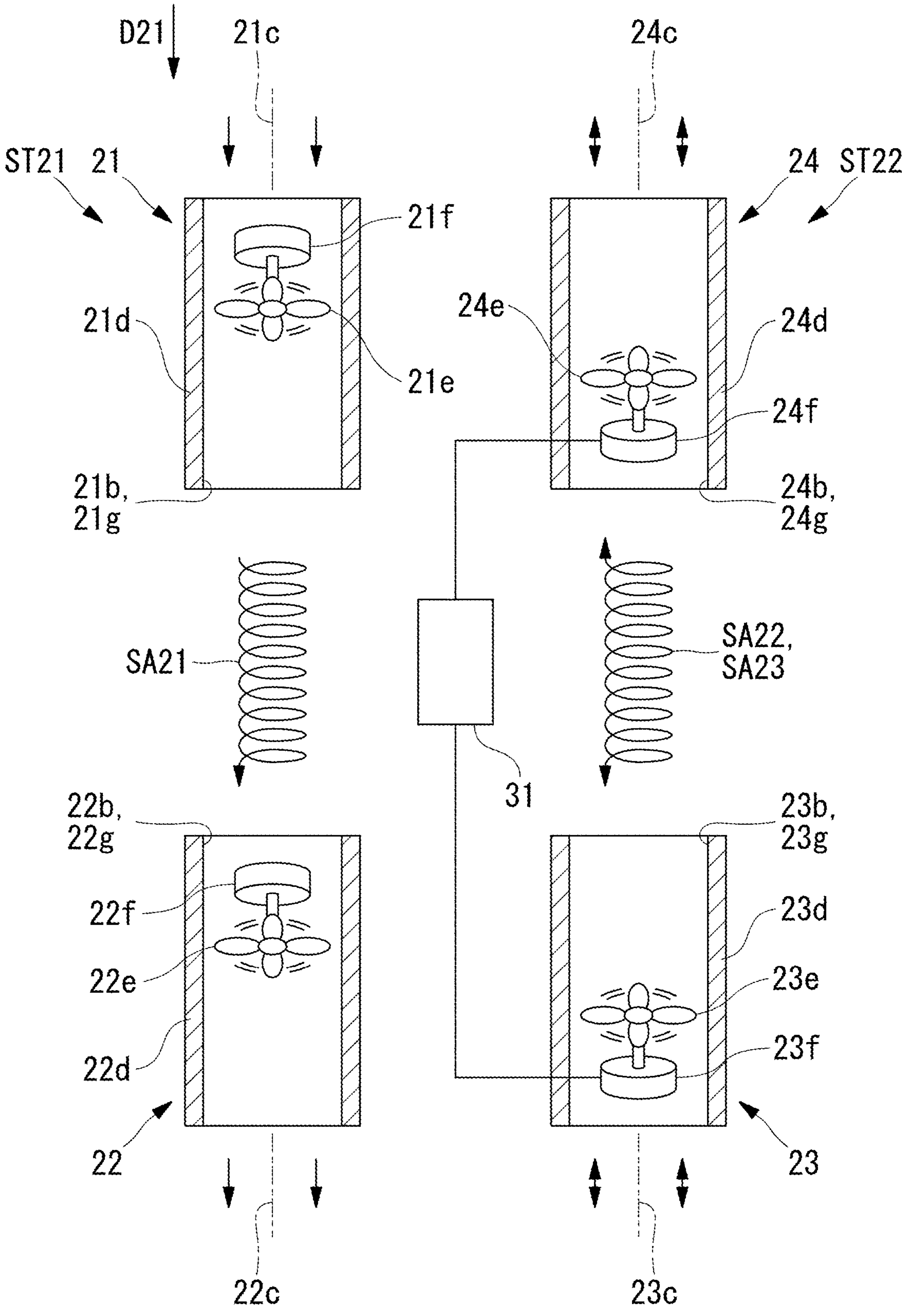
FIG. 7 is a cross-sectional view schematically illustrating parts of the air shower apparatus according to the modification of the embodiment.
Figure 8:
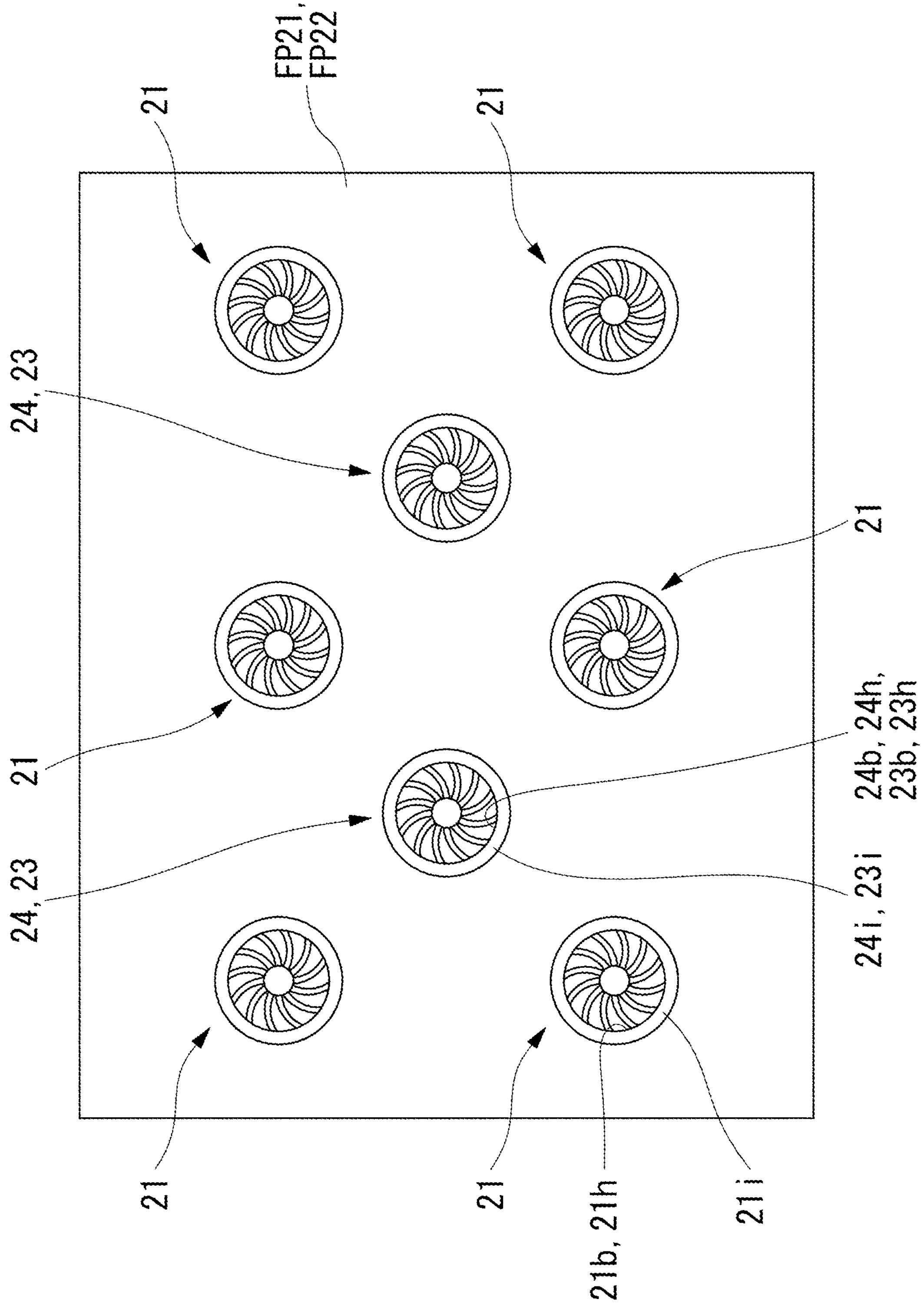
FIG. 8 is a diagram schematically illustrating the configuration of the air shower apparatus according to the modification of the embodiment.

FIG. 6 is a front view schematically illustrating a configuration of an air shower apparatus according to the modification of the embodiment. FIG. 7 is a cross-sectional view schematically illustrating parts of the air shower apparatus according to the modification of the embodiment. FIG. 8 is a diagram schematically illustrating the configuration of the air shower apparatus according to the modification of the embodiment. Note that a direction D21 in FIG. 6 corresponds to the direction D12 (vertical direction) in FIG. 1, and a direction D22 in FIG. 6 corresponds to the direction D11 (horizontal direction) in FIG. 1.

As illustrated in FIGS. 6 to 8, similarly to the air shower apparatus 1 according to the embodiment, the air shower apparatus 1*a* according to the present modification includes a face portion FP21 and a face portion FP22 disposed to face each other in the direction D21, and generates an air shower inside a space SP between the face portion FP21 and the face portion FP22. The air shower apparatus 1*a* includes a plurality of blowers (circulators) 21, a plurality of blowers (circulators) 22, a plurality of blowers (circulators) 23, and a plurality of blowers (circulators) 24.

Note that the face portion FP21 and the face portion FP22 in the air shower apparatus 1*a* according to the present modification correspond to the face portion FP13 (ceiling face portion) and the face portion FP14 (floor face portion) in the air shower apparatus 1 according to the embodiment, and the face portion FP23 and the face portion FP24 in the air shower apparatus 1*a* according to the present modification correspond to the face portion FP11 (side face portion) and the face portion FP12 (side face portion) in the air shower apparatus 1 according to the embodiment. In addition, the plurality of blowers 21 and the plurality of blowers 22 in the air shower apparatus 1*a* according to the present modification correspond to the plurality of blowers 15 and the plurality of blowers 16 in the air shower apparatus 1 according to the embodiment, and the plurality of blowers 23 and the plurality of blowers 24 in the air shower apparatus 1*a* according to the present modification correspond to the plurality of blowers 17 and the plurality of blowers 18 in the air shower apparatus 1 according to the embodiment.

Note that, although not described below, similarly to the air shower apparatus 1 according to the embodiment, the air shower apparatus 1*a* according to the present modification may include a plurality of blowers 25 corresponding to the plurality of blowers 11, a plurality of blowers 26 corresponding to the plurality of blowers 12, a plurality of blowers 27 corresponding to the plurality of blowers 13, and a plurality of blowers 28 corresponding to the plurality of blowers 14.

Meanwhile, unlike the air shower apparatus 1 according to the embodiment, the air shower apparatus 1*a* according to the present modification includes a switching unit 31 (see FIG. 7) that switches the operations of the plurality of blowers 23 and the plurality of blowers 24.

Each of the plurality of blowers 21 is provided in the face portion FP21 and includes an opening 21*b* through which air is blown out. The plurality of blowers 22 are provided in the face portion FP22 and each includes an opening 22*b* through which air is sucked, and the opening 22*b* is disposed to face the opening 21*b* included in each of the plurality of blowers 21.

The plurality of blowers 23 are provided in the face portion FP22, and each includes an opening 23*b* through which air is blown out or sucked. The plurality of blowers 24 are provided in the face portion FP21, and each includes an opening 24*b* through which air is sucked or blown out, and the opening 24*b* is disposed to face the opening 23*b* included in each of the plurality of blowers 23.

Specifically, each of the plurality of blowers 21 can include a cylindrical portion 21*d* centered on a central axis 21*c* along the direction D21, a fan 21*e* provided rotatably about the central axis 21*c* inside the cylindrical portion 21*d*, and a drive unit 21*f* that rotationally drives the fan 21*e* in a ninth rotational direction that is a clockwise or counterclockwise rotational direction. In such a case, the opening 21*b* is provided at an end portion 21*g* of the cylindrical portion 21*d* on the face portion FP22 side in the direction along the direction D21. The fan 21*e* sucks air from the side opposite to the end portion 21*g* of the cylindrical portion 21*d* and blows out the sucked air from the opening 21*b*.

In addition, each of the plurality of blowers 22 can include a cylindrical portion 22*d* centered on a central axis 22*c* along the direction D21, a fan 22*e* provided rotatably about the central axis 22*c* inside the cylindrical portion 22*d*, and a drive unit 22*f* that rotationally drives the fan 22*e* in a 10th rotational direction that is a clockwise or counterclockwise rotational direction. In such a case, the opening 22*b* is provided at an end portion 22*g* of the cylindrical portion 22*d* on the face portion FP21 side in the direction along the direction D21. The fan 22*e* sucks air from the opening 22*b* and blows out the air sucked from the opening 22*b* from the side opposite to the end portion 22*g* of the cylindrical portion 22*d*.

In addition, each of the plurality of blowers 23 can include a cylindrical portion 23*d* centered on a central axis 23*c* along the direction D21, a fan 23*e* provided rotatably about the central axis 23*c* inside the cylindrical portion 23*d*, and a drive unit 23*f* that rotationally drives the fan 23*e* in an 11th rotational direction that is a clockwise or counterclockwise rotational direction. In such a case, the opening 23*b* is provided at an end portion 23*g* of the cylindrical portion 23*d* on the face portion FP21 side in the direction along the direction D21. The fan 23*e* sucks air from the side opposite to the end portion 23*g* of the cylindrical portion 23*d* and blows out the sucked air from the opening 23*b*.

In addition, each of the plurality of blowers 24 can include a cylindrical portion 24*d* centered on a central axis 24*c* along the direction D21, a fan 24*e* provided rotatably about the central axis 24*c* inside the cylindrical portion 24*d*, and a drive unit 24*f* that rotationally drives the fan 24*e* in a 12th rotational direction that is a clockwise or counterclockwise rotational direction. In such a case, the opening 24*b* is provided at an end portion 24*g* of the cylindrical portion 24*d* on the face portion FP22 side in the direction along the direction D21. The fan 24*e* sucks air from the opening 24*b* and blows out the air sucked from the opening 24*b* from the side opposite to the end portion 24*g* of the cylindrical portion 24*d*.

Also in the present modification, similarly to the embodiment, for each of the plurality of blowers 21, a set ST21 is formed by a blower 21 and a blower 22 which is one of the plurality of blowers 22 and includes the opening 22*b* disposed to face the opening 21*b* included in the blower 21.

In the set ST21 of the blower 21 and the blower 22, the blower 21 blows out a spiral airflow SA21 from the opening 21*b* included in the blower 21 toward the opening 22*b* included in the blower 22. In addition, in the set ST21 of the blower 21 and the blower 22, the blower 22 sucks the spiral airflow SA21 blown out by the blower 21 from the opening 21*b* included in the blower 21 toward the opening 22*b* included in the blower 22 from the opening 22*b* included in the blower 22.

Also in the present modification, similarly to the embodiment, for each of the plurality of blowers 23, a set ST22 is formed by a blower 23 and a blower 24 which is one of the plurality of blowers 24 and includes the opening 24*b* disposed to face the opening 23*b* included in the blower 23.

Meanwhile, in the present modification, unlike the embodiment, in the set ST22 of the blower 23 and the blower 24, the switching unit 31 switches the operations of the plurality of blowers 23 and the plurality of blowers 24 such that the blower 23 blows out the spiral airflow SA22 from the opening 23*b* included in the blower 23 toward the opening 24*b* included in the blower 24, or the blower 24 blows out the spiral airflow SA23 from the opening 24*b* included in the blower 24 toward the opening 23*b* included in the blower 23. In addition, in the set ST22 of the blower 23 and the blower 24, the switching unit 31 switches the operations of the plurality of blowers 23 and the plurality of blowers 24 such that the blower 24 sucks the spiral airflow SA22 blown out by the blower 23 from the opening 24*b* included in the blower 24 when the blower 23 blows out the spiral airflow SA22, and the blower 23 sucks the spiral airflow SA23 blown out by the blower 24 from the opening 23*b* included in the blower 23 when the blower 24 blows out the spiral airflow SA23.

In addition, the air shower apparatus 1*a* according to the present modification generates the air shower inside the space SP by the plurality of spiral airflows SA21 blown out from the plurality of openings 21*b* included in each of the plurality of blowers 21 and the plurality of spiral airflows SA22 blown out from the plurality of openings 23*b* included in each of the plurality of blowers 23 or the plurality of spiral airflows SA23 blown out from the plurality of openings 24*b* included in each of the plurality of blowers 24.

Also in the present modification, similarly to the embodiment, the air discharged by blowing out the plurality of spiral airflows SA21 from the plurality of openings 21*b* is exhausted in the same direction as the discharged direction. Thus, the airflow (convection) can be prevented or suppressed from being disturbed, and dust and dirt adhering to the clothes of the person VS entering the clean room or the like can be prevented or suppressed from flying around in the space of the air shower chamber.

In addition, even when the plurality of spiral airflows SA22 are blown out from the plurality of openings 23*b*, it is possible to prevent or suppress the airflow (convection) from being disturbed. Thus, it is possible to blow air not only to the portions facing the face portion FP21 but also to the portions facing the face portion FP22 in the clothes of the person VS entering to the clean room or the like, and it is possible to efficiently remove dust and dirt adhering to the clothes of the entering person VS.

Meanwhile, in the air shower apparatus 1*a* according to the present modification, unlike the air shower apparatus 1 according to the embodiment, it is possible to switch by the switching unit 31 between blowing out the spiral airflow SA22 from the opening 23*b* toward the opening 24*b* and blowing out the spiral airflow SA23 from the opening 24*b* toward the opening 23*b*.

As a result, it is possible to easily switch between a case where all of the spiral airflows are blown out in the same direction and a case where some of the spiral airflows among all of the spiral airflows are blown out in the direction opposite to the direction in which the other spiral airflows are blown out when the air shower is generated in the space between the two face portions disposed to face each other. Thus, it is possible to easily use properly a method of efficiently removing dust and dirt adhering to the clothes of the entering person and a method of preventing or suppressing dust and dirt adhering to the clothes of the entering person from flying around in the space of the air shower chamber according to the dirt and dust adhering to the clothes of the entering person to the clean room or the like, or according to the use in the case of being installed in a store, an office, a commercial facility, or the like.

As illustrated in FIG. 6, preferably, the direction D21 is a vertical direction, the face portion FP21 is a ceiling face portion, and the face portion FP22 is a floor face portion.

In such a case, by blowing out the spiral airflow SA23 from the opening 24*b* toward the opening 23*b*, all of the spiral airflows are directed from the ceiling face portion toward the floor face portion, and thus it is possible to prevent or suppress dust and dirt from being stirred up from below. In addition, in a case where the air shower apparatus is installed in a store, an office, a commercial facility, or the like, even in a case where a person entering a room of the store, the office, or the commercial facility from the outside wears clothes such as a skirt, it is possible to prevent the clothes from being blown up by the airflow.

As illustrated in FIG. 7, preferably, in the set ST22 of the blower 23 and the blower 24, the switching unit 31 switches the operations of the plurality of blowers 23 and the plurality of blowers 24 by switching the 11th rotational direction of the fan 23*e* rotationally driven by the drive unit 23*f* and the 12th rotational direction of the fan 24*e* rotationally driven by the drive unit 24*f* such that the fan 23*e* blows out air from the opening 23*b* or the fan 24*e* blows out air from the opening 24*b*. In addition, in the set ST22 of the blower 23 and the blower 24, the switching unit 31 switches the operations of the plurality of blowers 23 and the plurality of blowers 24 by switching the 11th rotational direction of the fan 23*e* rotationally driven by the drive unit 23*f* and the 12th rotational direction of the fan 24*e* rotationally driven by the drive unit 24*f* such that the fan 24*e* sucks air from the opening 24*b* when the fan 23*e* blows out air from the opening 23*b* and the fan 23*e* sucks air from the opening 23*b* when the fan 24*e* blows out air from the opening 24*b*.

By such a method, it is possible to easily switch between blowing out the spiral airflow SA22 from the opening 23*b* toward the opening 24*b* and blowing out the spiral airflow SA23 from the opening 24*b* toward the opening 23*b*. Note that, instead of the method of reversing the rotational directions of the fan 23*e* and the fan 24*e*, a method of reversing the directions of the cylindrical portion 23*d* and the cylindrical portion 24*d* from the direction same as the direction D21 to the opposite direction can also be used.

In addition, as illustrated in FIG. 6, preferably, similarly to the air shower apparatus 1 according to the embodiment, the air shower apparatus 1*a* according to the present modification includes the face portion FP23 and the face portion FP24 disposed to face each other in the direction D22 intersecting the direction D21, and generates the air shower inside the space SP between the face portion FP23 and the face portion FP24. In such a case, as described above, the air shower apparatus 1*a* includes the plurality of blowers (circulators) 25, the plurality of blowers (circulators) 26, the plurality of blowers (circulators) 27, and the plurality of blowers (circulators) 28. In addition, as described above, the direction D21 in FIG. 6 corresponds to the direction D12 (vertical direction) in FIG. 1, and the direction D22 in FIG. 6 corresponds to the direction D11 (horizontal direction) in FIG. 1.

As illustrated in FIG. 8, preferably, each of the plurality of openings 21*b* included in each of the plurality of blowers 21 is disposed so as not to overlap any of the plurality of openings 23*b* included in each of the plurality of blowers 23 when viewed in the direction D21 (see FIG. 7). In addition, each of the plurality of openings 22*b* (see FIG. 7) included in each of the plurality of blowers 22 (see FIG. 7) is disposed so as not to overlap any of the plurality of openings 24*b* included in each of the plurality of blowers 24 when viewed from the direction D21.

As a result, even when the spiral airflow SA22 is blown out from the opening 23*b* toward the opening 24*b*, it is possible to prevent or suppress the spiral airflows SA21 blown out from the plurality of openings 21*b* and the spiral airflows SA22 blown out from the plurality of openings 23*b* from coming into contact with each other. Thus, it is possible to prevent or suppress the airflow from being disturbed, and it is possible to prevent or suppress dust and dirt adhering to the clothes of the person VS entering the clean room or the like from flying around in the space of the air shower chamber.

Note that, although not illustrated, also in the present modification, similarly to the embodiment described with reference to FIG. 3, in the set ST21 of the blower 21 and the blower 22, the opening 21*b* and the opening 22*b* are disposed to overlap each other when viewed from the direction D21. In addition, in the set ST22 of the blower 23 and the blower 24, the opening 23*b* and the opening 24*b* are disposed to overlap each other when viewed from the direction D21.

In addition, also in the present modification, similarly to the embodiment, preferably, when viewed from the direction D21, a center-to-center distance between the opening 21*b* and the opening 24*b* adjacent to each other is larger than both of twice the diameter of the opening 21*b* and twice the diameter of the opening 24*b*. In addition, also in the present modification, similarly to the embodiment, preferably, when viewed from the direction D21, a center-to-center distance between the opening 23*b* and the opening 22*b* adjacent to each other is larger than both of twice the diameter of the opening 23*b* and twice the diameter of the opening 22*b*.

Alternatively, also in the present modification, similarly to the embodiment, preferably, when viewed from the direction D21, a center-to-center distance between the opening 21*b* and the opening 24*b* adjacent to each other is smaller than a center-to-center distance between the two openings 21*b* adjacent to each other and smaller than a center-to-center distance between the two openings 24*b* adjacent to each other. In addition, also in the present modification, similarly to the embodiment, preferably, when viewed from the direction D21, a center-to-center distance between the opening 23*b* and the opening 22*b* adjacent to each other is smaller than a center-to-center distance between the two openings 23*b* adjacent to each other and smaller than a center-to-center distance between the two openings 22*b* adjacent to each other.

Preferably, also in the present modification, similarly to the embodiment, each of the plurality of blowers 21 includes a grille 21*i* provided in the opening 21*b* and formed with a plurality of holes 21*h* each having a spiral shape swirling clockwise or counterclockwise when viewed from the direction D21. In addition, each of the plurality of blowers 23 includes a grille 23*i* provided in the opening 23*b* and formed with a plurality of holes 23*h* each having a spiral shape swirling clockwise or counterclockwise when viewed from direction D21.

Meanwhile, in the present modification, unlike the embodiment, each of the plurality of blowers 24 includes a grille 24*i* provided in the opening 24*b* and formed with a plurality of holes 24*h* each having a spiral shape swirling clockwise or counterclockwise when viewed from the direction D21. That is, in the present modification, unlike the embodiment, each of the plurality of blowers 21 and the plurality of blowers 24 provided in the face portion FP21 as the ceiling face portion includes a grille in which holes having a spiral shape are formed.

In a case where each of the plurality of holes 24*h* formed in the grille 24*i* has a spiral shape swirling clockwise or counterclockwise, the spiral airflow SA23 having a spiral shape can be easily blown out as compared with a case where the plurality of holes 24*h* formed in the grille 24*i* does not have a spiral shape swirling clockwise or counterclockwise. Note that, when viewed from the blower 23 toward the blower 24, the rotational direction of the spiral shape of the holes 24*h* formed in the grille 24*i*, the rotational direction of the spiral airflow SA23 blown out by the blower 24, and the rotational direction of the fan 24*e* are the same rotational direction.

By each of the plurality of blowers 24 including the grille 24*i*, in the present modification, unlike the embodiment, it is possible to switch between blowing out the spiral airflow SA22 from the opening 23*b* toward the opening 24*b* and blowing out the spiral airflow SA23 from the opening 24*b* toward the opening 23*b*.

Although the invention made by the inventors has been specifically described based on the embodiments, the present invention is not limited to the embodiments, and it is obvious that various modifications can be made without departing from the gist of the invention.

Within the scope of the idea of the present invention, those skilled in the art can conceive various changes and modifications, and it is understood that the changes and modifications also fall within the scope of the present invention.

For example, as long as the gist of the present invention is included, those in which a person skilled in the art appropriately adds, deletes, or changes the design of the constituent elements, or adds, omits, or changes the conditions of the steps with respect to the above-described embodiment and modification are included in the scope of the present invention.

The present invention is effectively applied to an air shower apparatus that generates an air shower.

What is claimed is:

1. An air shower apparatus comprising:

a first face portion and a second face portion disposed to face each other in a first direction and generating an air shower inside a first space between the first face portion and the second face portion;

a plurality of first blowers provided in the first face portion, each of the first blowers comprising a first blow-out port from which air is blown out;

a plurality of second blowers provided in the second face portion, each of the second blowers comprising a first suction port through which air is sucked, the first suction port being disposed to face the first blow-out port in each of the first blowers, wherein, in a first set comprising a first blower from the plurality of first blowers and a second blower from the plurality of second blowers, the first blower blows out a first spiral airflow from the first blow-out port in the first blower toward the first suction port in the second blower, the second blower sucks the first spiral airflow blown out by the first blower from the first suction port in the second blower, and the air shower apparatus generates the air shower inside the first space by a plurality of the first spiral airflows blown out from a plurality of the first blow-out ports in each of the first blowers;

a plurality of third blowers provided in the second face portion, each of the third blowers comprising a second blow-out port from which air is blown out; and a plurality of fourth blowers provided in the first face portion, each of the fourth blowers comprising a second suction port through which air is sucked, the second suction port being disposed to face the second blow-out port in each of the third blowers, wherein, in a second set comprising a third blower from the plurality of third blowers and a fourth blower from the plurality of fourth blowers, the third blower blows out a second spiral airflow from the second blow-out port in the third blower toward the second suction port in the fourth blower, the fourth blower sucks the second spiral airflow blown out by the third blower from the second suction port in the fourth blower, and the air shower apparatus generates the air shower inside the first space by a plurality of the second spiral airflows blown out from a plurality of the second blow-out ports in each of the third blowers.

2. The air shower apparatus according to claim 1, wherein each of the first blow-out ports is disposed not overlapping any of the plurality of second blow-out ports when viewed from the first direction.

3. An air shower apparatus comprising:

a first face portion and a second face portion disposed to face each other in a first direction and generating an air shower inside a first space between the first face portion and the second face portion;

a plurality of first blowers provided in the first face portion, each of the first blowers comprising a first blow-out port from which air is blown out;

a plurality of second blowers provided in the second face portion, each of the second blowers comprising a first suction port through which air is sucked, the first suction port being disposed to face the first blow-out port in each of the first blowers;

wherein, in a first set comprising a first blower from the plurality of first blowers and a second blower from the plurality of second blowers, the first blower blows out a first spiral airflow from the first blow-out port in the first blower toward the first suction port in the second blower, the second blower sucks the first spiral airflow blown out by the first blower from the first suction port in the second blower, and the air shower apparatus generates the air shower inside the first space by a plurality of the first spiral airflows blown out from a plurality of the first blow-out ports in each of the first blowers;

a third face portion and a fourth face portion disposed to face each other in a second direction intersecting the first direction, the air shower apparatus generating the air shower inside the first space between the third face portion and the fourth face portion;

a plurality of fifth blowers provided in the third face portion, each of the fifth blowers comprising a third blow-out port from which air is blown out;

a plurality of sixth blowers provided in the fourth face portion, each of the sixth blowers comprising a third suction port through which air is sucked, the third suction port being disposed to face the third blow-out port in each of the fifth blowers;

a plurality of seventh blowers provided in the fourth face portion, each of the seventh blowers comprising a fourth blow-out port from which air is blown out; and a plurality of eighth blowers provided in the third face portion, each of the eighth blowers comprising a fourth suction port through which air is sucked, the fourth suction port being disposed to face the fourth blow-out port in each of the seventh blowers;

wherein, in a third set comprising a fifth blower from the plurality of fifth blowers and a sixth blower from the plurality of sixth blowers, the fifth blower blows out a third spiral airflow from the third blow-out port in the fifth blower toward the third suction port in the sixth blower, and the sixth blower sucks the third spiral airflow blown out by the fifth blower from the third suction port in the sixth blower, and wherein, in a fourth set comprising a seventh blower from the plurality of seventh blowers and an eighth blower from the plurality of eighth blowers, the seventh blower blows out a fourth spiral airflow from the fourth blow-out port in the seventh blower toward the fourth suction port in the eighth blower, and the eighth blower sucks the fourth spiral airflow blown out by the seventh blower from the fourth suction port in the eighth blower, and the air shower apparatus generates the air shower inside the first space by a plurality of the third spiral airflows blown out from a plurality of the third blow-out ports in each of the fifth blowers and a plurality of the fourth spiral airflows blown out from a plurality of the fourth blow-out ports in each of the seventh blowers.

4. The air shower apparatus according to claim 1, wherein each of the plurality of first blowers comprises a first grille provided in the first blow-out port, the first grille being formed with a plurality of holes each having a spiral shape swirling clockwise or counterclockwise when viewed from the first direction.

5. The air shower apparatus according to claim 3, wherein each of the first blow-out ports is disposed not overlapping any of the second blow-out ports when viewed from the first direction.

6. The air shower apparatus according to claim 3, wherein each of the plurality of first blowers comprises a first grille provided in the first blow-out port, the first grille being formed with a plurality of holes each having a spiral shape swirling clockwise or counterclockwise when viewed from the first direction.

* * * * *